Dec. 28, 1965
J. D. RICHARD
3,225,593
WAVE MEASURING APPARATUS
Filed Nov. 20, 1962
2 Sheets-Sheet 1
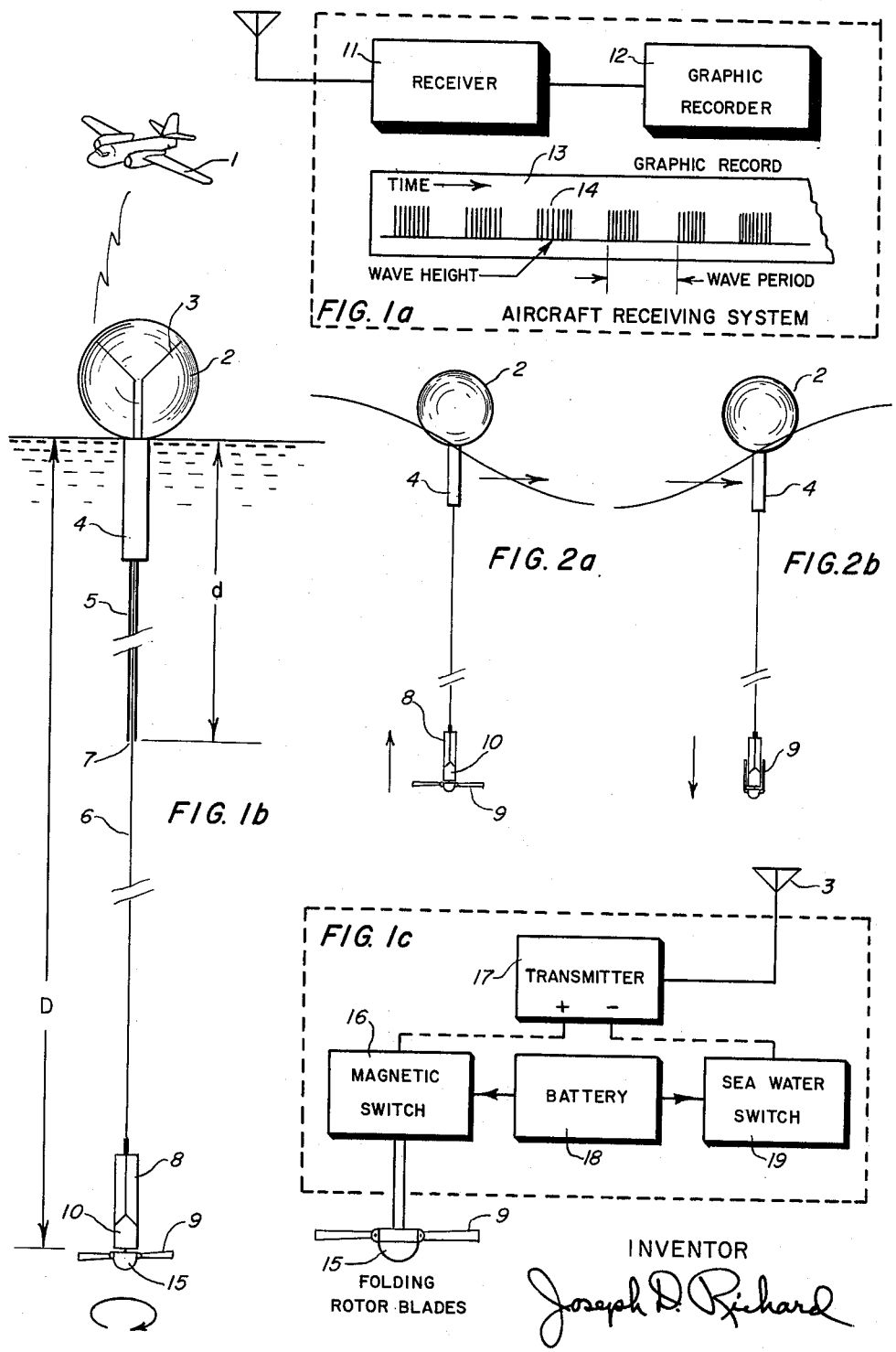
INVENTOR
Joseph D. Richard Dec. 28, 1965  J. D. RICHARD  3,225,593
WAVE MEASURING APPARATUS
Filed Nov. 20, 1962  2 Sheets-Sheet 2
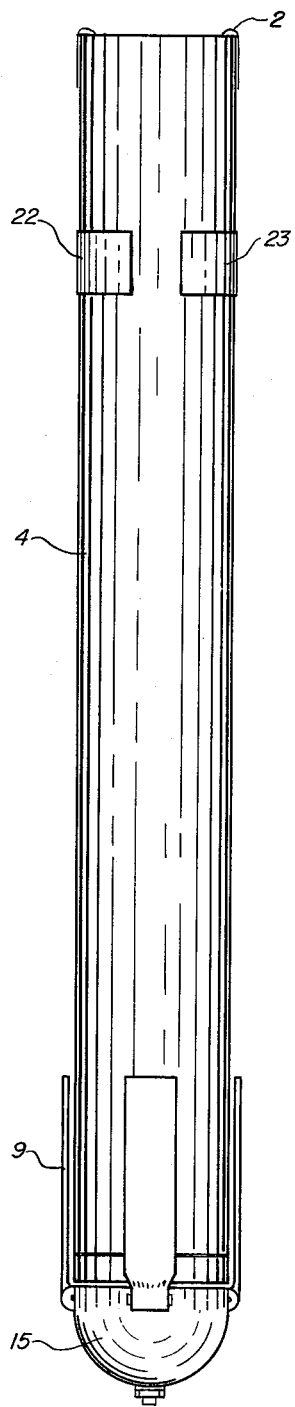
FIG. 3
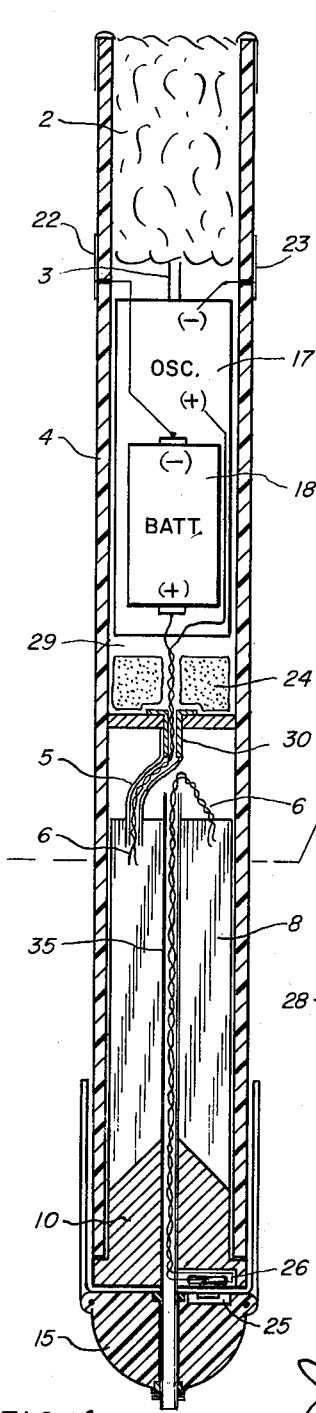
FIG. 4
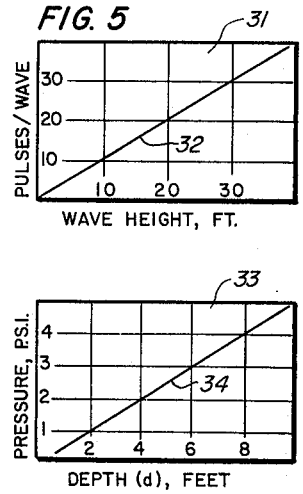
FIG. 5
FIG. 6
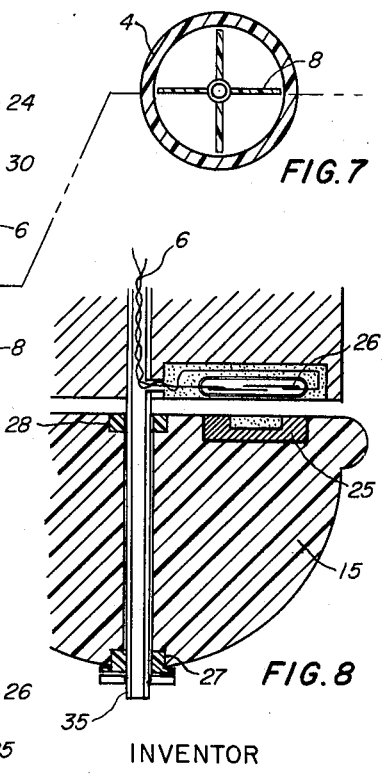
FIG. 7
FIG. 8
INVENTOR
Joseph D. Richard United States Patent Office 3,225,593
Patented Dec. 28, 1965

3,225,593
WAVE MEASURING APPARATUS
Joseph D. Richard, Miami, Fla. (531 S. Barrancas Ave., Warrington, Pensacola, Fla.)
Filed Nov. 20, 1962, Ser. No. 238,934
4 Claims. (Cl. 73—170)

This invention relates generally to apparatus for measuring the characteristics of ocean waves. More specifically, the present invention relates to a method and apparatus whereby the height, period, and other parameters of ocean waves may be accurately measured from aircraft or ships.

In the past, a number of techniques have been used for measuring ocean waves. Wave recorders which have been operated from shore stations have been generally satisfactory but a number of problems have been encountered in the use of free floating wave meters in the open oceans. These free floating wave measuring devices have usually consisted of a vertically oriented spar which is stabilized against vertical motion by means of a suitable damping member suspended in the relatively motionless water a considerable distance beneath the float. Vertical fluctuations of the water surface along the relatively stationary pole are sensed resistively or capacitively and the corresponding electrical signal used to modulate a radio transmitter. Other wave poles have sensed the continuous fluctuations of pressure beneath the vertically stabilized buoy as an analog of the instantaneous wave height.

An outstanding objection to the methods used in the past to measure wave characteristics in the open ocean has been the complexity of the systems used and the concomitant difficulties which have been experienced in relating the graphic records of wave profiles to absolute wave heights.

Another objection to the free floating wave measuring devices used in the past has been the excessive lengths of the wave poles which were required to accommodate a wide range of wave heights.

An object of the present invention is to provide a free floating wave measuring system which is devoid of the above mentioned disadvantages and difficulties and which is otherwise practical and economical.

The present invention provides an extremely small and inexpensive wave measuring device which may be dropped into the ocean from an aircraft. When the telemetering buoy falls into the ocean, a balloon is inflated within which the radio antenna is suspended. The inflated balloon serves as a support for the antenna and also to protect it from sea water. A method is described whereby the pressure within the balloon is positively prevented from exceeding a predetermined value. A plummet is suspended beneath the buoy at some suitable depth below the deepest penetration of orbital wave motion. Rotor blades attached to the plummet are caused to rotate as the plummet rises and falls through the relatively stationary water. The pitch of the rotor blades are conveniently set so that each revolution is indicative of some desired increment of vertical travel. Each revolution of the rotor actuates a magnetic switch which pulses the radio transmitter. In this manner each wave height may be easily determined from the graphic record of the receiving system by simply counting the number of pulses received during each wave period. In a preferred embodiment of my invention, folding rotor blades are used on the plummet so that pulses are produced only when the plummet is rising. Otherwise an excessive plummet weight would be necessary and further complexity would be required to distinguish the rising and falling portions of each wave on the graphic record. Thus the trough to crest displacement or wave height is transmitted and recorded in digital form. Wave period and a number of other wave characteristics may also be determined from the graphic record.

Other objects and advantages will become more apparent from the study of the following specifications and drawings in which:

FIGURES 1a, 1b, and 1c show the general method of making wave height measurements from an aircraft.

FIGURES 2a and 2b show the relative behavior of the plummet rotor blades for both rising and falling positions.

FIGURE 3 shows an exterior view of a preferred type of wave measuring unit according to my invention.

FIGURE 4 shows a sectional view of the same unit before being dropped in the ocean.

FIGURE 5 shows the relationship between wave height and the number of pulses received for each wave.

FIGURE 6 shows the relationship between maximum inflation pressure and the length of the pressure relief tube according to the preferred form of my invention.

FIGURE 7 shows a cross sectional view of the stabilizing fins on the plummet body shown in FIGURE 4.

FIGURE 8 shows a more detailed cross sectional view of the rotor including the magnetic switch and magnet.

Referring more specifically to FIGURES 1a, 1b, and 1c, an aircraft 1 is shown after having dropped the wave measuring apparatus into the ocean. The balloon 2 which supports and covers the antenna 3 is shown after having been inflated. A simple radio transmitter 17 is connected to the negative side of the battery 18 through the sea water switch 19 when the housing 4 enters the water. The positive side of the battery 18 is connected to the transmitter 17 by the magnetic switch 16 for a brief interval for each revolution of the rotor 15. The rotor 15 is turned by the rotor blades 9 when the plummet 10 is pulled up through the water by the balloon supported housing 4 as it rises with each wave. The pitch of the rotor blades 9 are set so that each increment of vertical travel upward of the plummet is indicated by a specific number of revolution of the rotor and a corresponding number of pulses of the radio transmitter. In this preferred embodiment of the present invention the rotor blades 9 are arranged so that they fold back when the plummet falls through the water. Thus the pulses are only transmitted during the rising portion of each wave period. The transmitted radio pulses are picked up by the receiver 11 and recorded on the graphic recorder 12. The graphic record 13 shows a typical pulse group 14 which indicates a wave height of eight feet. The time spacing between corresponding portions of successive waves indicates the wave period. Obviously other wave characteristics may also be determined from the graphic record such as wave steepness, height variability, period variability, and from these, the frequency spectrum. The graphic record 13 is in a form which is ideally suited for machine analysis, retransmission, or storage on punched cards or tape. The plummet 10 is suspended at a considerable depth beneath the balloon 2 so that it is not affected adversely by orbital water motion. A depth of one hundred feet is entirely adequate for virtually all conditions encountered in the open ocean.

FIGURES 2a and 2b show the housing 4 with the inflated balloon 2 rising with a wave as in FIGURE 2a and falling with a wave as in FIGURE 2b. When rising, the rotor blades 9 are open so that the rotor revolves freely. When falling the blades 9 are folded back. Fins 8 are provided to minimize rotation of the plummet 10 as the rotor turns.

FIGURE 3 shows an exterior view of the wave measuring apparatus before immersion. A pair of electrodes 22 and 23 are shown mounted on the outside of the cylindrical housing 4.

FIGURE 4 shows the balloon 2 folded within the upper end of the housing 4. When the unit is dropped into the water, the plummet 10 falls free from the cylindrical housing so that the tubing 5 and the electrical leads 6 are extended out beneath the housing 4 as shown in FIGURE 1. Sea water immediately intrudes into the open end 7 of the tubing 5 and thus into the chamber 29 where it instantly reacts with the chemical 24 to produce a copious quantity of gas. Typically the chemical 24 may be calcium carbide and the gas generated would be acetylene. The generated gas flows freely around the oscillator and battery capsule and inflates the balloon 2. The excess gas then forces the intruded water back down the tubing 5 until bubbles are expelled from open end 7. The gas pressure within the balloon 2 is thus limited by the hydrostatic pressure which exists at the open end 7 of the tubing 5. Assuming that an adequate quantity of chemical 25 is used, the exact gas pressure which will be achieved within the balloon 2 can be predetermined precisely by the length of the tubing 5.

The plummet body 10 is made of a heavy metal so that it sinks rapidly during the falling portion of each wave period. Fins 8 are attached to the plummet body 10 so that its rotation will be minimized. A magnetic reed switch 26 is encapsulated within the plummet body 10. This normally open switch is connected across the twin leads 6 by which the plummet body is suspended beneath the housing 4. The electrical leads 6 connect the positive side of the battery 18 with the positive power input of the oscillator 17. Thus the oscillator 17 is energized when the magnetic reed switch 26 is closed. A magnet 25 is shown mounted within the rotor 15. The magnet 25 passes close to and parallel with the magnetic reed switch 26 once during each revolution of the rotor 15. Thus the magnetic switch 26 is closed for a brief interval for each revolution of the rotor 15. The pitch of the rotor blades 9 are set so that they revolve a precisely known number of times for each increment of vertical travel through the water. For example the rotor blades 9 may be set so that they revolve once for each foot of travel through the water. It can be readily seen that the trough to crest vertical displacement of each wave will be indicated by the number of pulses radiated from the antenna 3 during each wave period. When the cylindrical housing 4 is dropped into the ocean, the electrodes 22 and 23 are shorted by the conductive sea water. In this manner the negative side of the battery 18 is connected to the oscillator 17 only when the unit is in the water. The antenna leads 3 are shown which are connected to the output of the oscillator 17. The antenna leads are flexible and are folded within the balloon 2 when not in use. The oscillator 17 consists of a single transistor circuit which typically might generate a signal of 100 milliwats at 160 megacycles.

FIGURE 5 shows a typical relationship between wave height and the number of pulses transmitted for each wave period. FIGURE 6 shows the relationship between the depth of the open end of the tubing 5 and the maximum pressure inside the balloon 2. FIGURE 7 shows a cross sectional view of the fins 8 which are mounted on the plummet body 10.

FIGURE 8 shows the magnetic reed switch 26 which is mounted within the plummet body 10. Also shown is the magnet 25 mounted within the rotor 15. The rotor 15 is mounted on the shaft 35 so that it may rotate freely. Teflon bushings 27 and 28 are provided for bearing on the shaft 35 to facilitate the rotation of the rotor 15. The magnetic reed switch 26 is closed each time the magnet 25 passes close to and parallel with it as the rotor 15 rotates.

It will be seen therefore that I have provided a method and apparatus for measuring the characteristics of waves in the open ocean. The device is particularly suitable for use from aircraft. Among the outstanding advantages achieved are the extremely small size and low cost of these expendible units. The wave measuring system is reliable and accurate and need never be calibrated. Wave height and period may be instantly determined from the graphic record by interested persons such as the pilot of a seaplane prior to landing on the ocean. A further advantage is found in the particular form in which the data is received and recorded. The sequence of pulses on the graphic record are ideally suited for subsequent re-transmission, instrument storage, and machine analysis. The apparatus described makes it entirely practical to measure ocean waves from aircraft.

Various modifications and adaptations may be suggested, by those skilled in the art without departing from the spirit and scope of the invention as defined in the following claims.

What is claimed is:

1. Wave measuring and telemetering apparatus comprising: an elongated cylindrical housing suitable for dropping into the ocean; a battery within the said housing; a radio transmitter within the said housing operable from the said battery; an inflatable balloon attached to the upper end of the said housing, the said balloon, when inflated, having substantially greater buoyancy relative to the said housing; a flexible antenna attached within the said balloon and connected to the output of the said transmitter; means for inflating the said balloon when the said housing is dropped in the water, the said antenna being thereby erected and maintained substantially above the surface of the water; a relatively heavy plummet body separable from the said housing; electrically conductive wires for suspending the said plummet body beneath the said housing at a depth substantially free from orbital water motion induced by surface waves; a bladed rotor attached to the said plummet body, the said rotor being free to rotate relative to the said plummet body when moved vertically through the water; a magnetic reed switch mounted within the said plummet body; a magnet mounted within the said rotor, the said switch being thereby closed for a brief interval for each revolution of the said rotor; and means for pulse modulating the said transmitter with each closure of the magnetic switch, radio signals being thereby transmitted which are indicative of the vertical displacements of the said housing as it floats on the surface of the ocean.

2. Expendable apparatus for telemetering wave characteristics from the surface of the ocean comprising: a housing suitable for dropping into the ocean from an aircraft; a radio transmitter within the said housing; an inflatable balloon attached to the upper end of the said housing, the said balloon, when inflated, having substantially greater buoyancy relative to the said housing; a flexible antenna attached within the said balloon, the said antenna being connected to the output of the said transmitter; a battery within the said housing; a sea water switch for completing the circuit from the said transmitter to the said battery when the said housing is immersed in the ocean; means for inflating the said balloon when the said housing is dropped in the ocean, the said antenna being thereby erected and maintained substantially above the surface of the water; a relatively heavy plummet body separable from the said housing; means for suspending the said plummet body beneath the said housing at a depth substantially free from orbital water motion induced by surface waves; a bladed rotor attached to the said plummet body, the said rotor being free to rotate relative to the said plummet body when moved vertically through the water; a magnet actuated switch within the said plummet body; a magnet mounted within the said rotor, the said switch being thereby momentarily closed for a brief interval for each revolution of the said rotor; and means for modulating the said transmitter with each closure of the said magnetic switch, radio signals being thereby transmitted which are indicative of certain characteristics of the ocean waves encountered by the said housing as it floats on the surface of the ocean.

3. Apparatus for telemetering wave height from the surface of the ocean comprising: a housing suitable for dropping into the ocean from an aircraft; a battery within the said housing; a radio transmitter within the said housing operable from the said battery; an inflatable balloon attached to the upper end of the said housing, the said balloon, when inflated, having substantially greater buoyancy relative to the said housing; a flexible antenna within the said balloon and connected to the output of the said transmitter; means for inflating the said balloon when the said housing is dropped in the water, the said antenna being thereby held erect substantially above the surface of the water; a relatively heavy plummet body separable from the said housing; means for suspending the said plummet body beneath the said housing at a depth substantially free from orbital water motion induced by surface waves; a bladed rotor attached to the said plummet body, the said rotor being free to rotate relative to the said plummet body when moved vertically through the water; means for constraining the said rotor from rotating except when moving upward through the water; a magnetic reed switch mounted within the said plummet body; a magnet mounted within the said rotor, the said switch being thereby closed for a brief interval for each revolution of the said rotor; and means for pulse modulating the said transmitter with each closure of the said magnetic switch, a series of pulses being thereby transmitted which correspond to the height of the ocean waves encountered by the said housing, the said pulses being transmitted only during the rising portion of each wave.

4. Expendable apparatus for telemetering wave characteristics from the surface of the ocean comprising: a housing suitable for dropping into the ocean from an aircraft; a radio transmitter within the said housing; an inflatable balloon attached to the upper end of the said housing, the said balloon, when inflated, having substantially greater buoyancy relative to the said housing; a flexible antenna attached within the said balloon, the said antenna being connected to the output of the said transmitter; a battery within the said housing; a sea water switch for completing the circuit from the said battery to the said transmitter upon immersion of the said housing in the ocean; means for inflating the said balloon when the said housing is dropped in the ocean, the said antenna being thereby erected and maintained substantially above the surface of the water; a relatively heavy plummet body separable from the said housing; at least one wire for suspending the said plummet body beneath the said housing at a depth substantially free from orbital water motion induced by surface waves; a bladed rotor attached to the said plummet body, the said rotor being free to rotate relative to the said plummet body when moved vertically through the water; means for constraining the said rotor from rotating when moving downward through the water; a magnetic reed switch mounted within the said plummet body; a magnet mounted within the said rotor, the said switch being thereby closed for a brief interval for each revolution of the said rotor; and means for pulse modulating the said transmitter with each closure of the said magnetic switch, a series of pulses being thereby transmitted which correspond to the height of the ocean waves encountered by the said housing, the said pulses being transmitted only during the rising portion of each wave period.

References Cited by the Examiner
UNITED STATES PATENTS

| | | | |
|---|---|---|---|
| 2,379,138 | 6/1945 | Fitting et al. | 340—5 |
| 2,839,920 | 6/1958 | MacAnespie. | |
| 3,006,002 | 10/1961 | Pingree et al. | |
| 3,024,358 | 3/1962 | Grady. | |
| 3,036,460 | 5/1962 | White et al. | 73—231 X |
| 3,093,808 | 6/1963 | Tatnall et al. | 340—2 |
| 3,113,285 | 12/1963 | Edwards | 73—170 X |

RICHARD C. QUEISSER, *Primary Examiner.*

C. L. JUSTUS, *Examiner.*